United States Patent
Wala

(10) Patent No.: US 10,090,902 B2
(45) Date of Patent: *Oct. 2, 2018

(54) DISTRIBUTED ANTENNA SYSTEM WITH UPLINK BANDWIDTH FOR SIGNAL ANALYSIS

(71) Applicant: CommScope Technologies LLC, Hickory, NC (US)

(72) Inventor: Philip M. Wala, Savage, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/483,706

(22) Filed: Apr. 10, 2017

(65) Prior Publication Data

US 2017/0214445 A1  Jul. 27, 2017

Related U.S. Application Data

(63) Continuation of application No. 14/932,525, filed on Nov. 4, 2015, now Pat. No. 9,621,246, which is a (Continued)

(51) Int. Cl.
*H04B 7/06* (2006.01)
*H04B 17/382* (2015.01)
*H04W 88/08* (2009.01)

(52) U.S. Cl.
CPC ......... *H04B 7/0613* (2013.01); *H04B 7/0608* (2013.01); *H04B 7/0691* (2013.01); *H04B 17/382* (2015.01); *H04W 88/085* (2013.01)

(58) Field of Classification Search
CPC .... H04B 7/024; H04B 7/0608; H04B 7/0684; H04B 7/0697
(Continued)

(56) References Cited

U.S. PATENT DOCUMENTS 6,236,365 B1 * 5/2001 LeBlanc ............. G01C 21/206
342/450
9,191,993 B2  11/2015 Wala
(Continued)

FOREIGN PATENT DOCUMENTS

JP  2007221813  8/2007
KR  1020050088300  9/2005

OTHER PUBLICATIONS

United States Patent and Trademark Office, "Notice of Allowance", "from U.S. Appl. No. 13/681,631", dated Jul. 17, 2015, pp. 1-5, Published in: US.
(Continued)

*Primary Examiner* — Ross Varndell
(74) *Attorney, Agent, or Firm* — Foggs & Powers LLC

(57) ABSTRACT

One embodiment is directed towards a distributed antenna system (DAS). The DAS includes a host unit a plurality of remote units communicatively coupled to the host unit. The plurality of remote units are configured to implement a common arrangement of resource blocks for uplink transport signals. The host unit is configured to instruct a subset of the plurality of remote units to send a digital sample stream over a monitor path of their respective uplink transport signals. One or more simulcast modules are configured to sum the monitor paths from the respective uplink transport signals to generate a summed digital sample stream, the one or more simulcast modules configured to send the summed digital sample stream to the host unit. The host unit is configured to provide a signal based on the summed digital sample stream to one or more signal analysis modules.

20 Claims, 8 Drawing Sheets

Related U.S. Application Data continuation of application No. 13/681,631, filed on Nov. 20, 2012, now Pat. No. 9,191,993.

(58) Field of Classification Search
IPC ............... H04B 7/024,4/0608, 7/0684, 7/0697
See application file for complete search history.

(56) References Cited

U.S. PATENT DOCUMENTS

| | | | |
|---|---|---|---|
| 9,621,246 B2 | 4/2017 | Wala | |
| 2005/0153712 A1* | 7/2005 | Osaka | G01S 5/0027 455/456.5 |
| 2007/0117590 A1 | 5/2007 | Aldana | |
| 2009/0180426 A1* | 7/2009 | Sabat | H04W 88/085 370/328 |
| 2010/0202356 A1* | 8/2010 | Fischer | H01Q 21/28 370/328 |
| 2011/0306380 A1* | 12/2011 | Zavadsky | H04B 7/0842 455/522 |
| 2013/0003658 A1* | 1/2013 | Stewart | H04B 7/022 370/328 |
| 2013/0107763 A1* | 5/2013 | Uyehara | H04B 7/024 370/278 |
| 2014/0072064 A1 | 3/2014 | Lemson et al. | |

OTHER PUBLICATIONS

United States Patent and Trademark Office, "Office Action", "from U.S. Appl. No. 13/681,631", dated Feb. 13, 2015, pp. 1-21, Published in: US.

United States Patent and Trademark Office, "Notice of Allowance", "From U.S. Appl. No. 14/932,525", dated Nov. 28, 2016, pp. 1-12, Published in: US.

United States Patent and Trademark Office, "Office Action", "From U.S. Appl. No. 14/932,525", dated Aug. 12, 2016, pp. 1-10, Published in: US.

Korean Intellectual Property Office, "International Search Report and Written Opinion from PCT Application No. PCT/US2013/070673 dated Feb. 13, 2014", "from PCT Counterpart of U.S. Appl. No. 13/681,631", dated Feb. 13, 2014, pp. 1-9, Published in: WO.

* cited by examiner

DISTRIBUTED ANTENNA SYSTEM WITH UPLINK BANDWIDTH FOR SIGNAL ANALYSIS

CROSS-REFERENCE TO RELATED APPLICATION

This application is a continuation of U.S. application Ser. No. 14/932,525, filed on Nov. 4, 2015, entitled "DISTRIBUTED ANTENNA SYSTEM WITH UPLINK BANDWIDTH FOR SIGNAL ANALYSIS", which is a continuation of U.S. application Ser. No. 13/681,631, filed on Nov. 20, 2012, entitled "DISTRIBUTED ANTENNA SYSTEM WITH UPLINK BANDWIDTH FOR SIGNAL ANALYSIS", now issued as U.S. Pat. No. 9,191,993, all of which are hereby incorporated herein by reference in their entireties.

BACKGROUND

A Distributed Antenna System (DAS) is a network of spatially separated antenna nodes that provide wireless service within a geographic area or structure. The spatially separated antenna nodes are coupled to a common node via one or more transport mediums. The common node is also referred to herein as a "host unit", and can be located at a centralized location. The antenna nodes are located at a location that is remote from the host unit and are also referred to herein as "remote units".

The host unit is typically communicatively coupled to one or more base stations which allow bidirectional communications between wireless subscriber units within the DAS service area and communication networks such as, but not limited to, cellular phone networks, the public switch telephone network (PSTN), and the Internet. The host unit can be communicatively coupled to the one or more base stations using one or more wired connections (for example, where the base stations are co-located with the host unit) and/or can be communicatively coupled to the one or more base stations using one or more wireless connections (for example, using one or more donor antennas and bi-directional amplifiers).

One type of DAS is referred to as a digital DAS. In a digital DAS, the signals transported between host unit and remote units comprise digital sample streams. A digital sample stream is a stream of digital samples (e.g., I/Q samples) corresponding to an RF bandwidth that was received at the remote unit (in the case of remote unit to host unit transport) or is to be transmitted from the remote unit (in the case of host unit to remote unit transport). To transport a digital sample stream between a host unit and a remote unit, the host unit or remote unit generates a signal that is conditioned for long distance transport over the respective transport medium and modulates the digital sample stream on the signal. The transport medium can comprise optical communication media (for example, optical fiber), copper communication medium (for example, coaxial or CATV cabling and/or twisted-pair cabling), and/or wireless communication links (for example, microwave wireless links). The transport medium can be implemented using various network topologies (for example, point-to-point topologies, star or tree topologies, and ring topologies as well as combinations thereof).

A DAS can be configured to implement simulcast transmission and reception of signals. In the downlink, simulcast refers to the process of transmitting the same signal from multiple remote units. In the uplink, simulcast refers to the process of combining signals from multiple remote units to be received as a single signal. To send the same (i.e., common) signal from multiple remote units, identical digital sample streams are sent to each of the multiple remote units concurrently such that each of the multiple remote units generates and transmits the same signal. To combine signals from multiple remote units, digital sample streams from multiple remote units are combined before being demodulated.

The processes of generating multiple identical digital sample streams for downlink simulcast and combining multiple digital sample streams for uplink simulcast can be performed by a simulcast module. To generate multiple digital sample streams for downlink simulcast, such a simulcast module can receive a digital sample stream from an upstream source (e.g., a host unit), can generate multiple copies of the digital sample stream, and can send each of the copies to a different downstream destination (e.g., a different remote unit) for transmission therefrom. To combine multiple digital sample streams, the simulcast module can receive the multiple digital sample streams, each at the same sample rate and from a different downstream source (e.g., a different remote unit), arithmetically sum corresponding digital samples from each of the digital sample streams to generate a single digital sample stream, and send the single digital sample stream to an upstream destination (e.g., a host unit).

Such a simulcast module can be part of (i.e., integrated in) a host unit and enable the host unit to generate and receive simulcast signals with multiple remote units. A simulcast module can also be part of remote unit and enable multiple remote units to be daisy chained together. A simulcast module can also be part of an intermediate node (also referred to as an "expansion unit" or an "expansion hub"). An intermediate node is located between a host unit and a plurality of remote units and is used to expand the geographical area and/or number or remotes units that a given host unit can service. Such an intermediate node can combine uplink signals from multiple remote units and distribute downlink signals to the multiple remote units.

SUMMARY

One embodiment is directed towards a distributed antenna system (DAS). The DAS includes a host unit and a plurality of remote units communicatively coupled to the host unit. The plurality of remote units are configured to implement a common arrangement of resource blocks for uplink transport signals. The DAS also includes one or more simulcast modules configured to implement simulcasting of signals. The host unit is configured to instruct a subset of the plurality of remote units to send a digital sample stream over a monitor path of their respective uplink transport signals. The one or more simulcast modules are configured to sum the monitor paths from the respective uplink transport signals to generate a summed digital sample stream, the one or more simulcast modules configured to send the summed digital sample stream to the host unit. The host unit is configured to provide a signal based on the summed digital sample stream to one or more signal analysis modules

DRAWINGS

Understanding that the drawings depict only exemplary embodiments of the present invention and are not therefore to be considered limiting in scope; the exemplary embodiments will be described with additional specificity and detail through the use of the accompanying drawings.

FIGS. 1A, 1B, and 1C are block diagrams of example telecommunication system including a distributed antenna system (DAS) implementing simulcasting.

In accordance with common practice, the various described features are not drawn to scale but are drawn to emphasize features relevant to the present invention. Reference characters denote like elements throughout figures and text.

DETAILED DESCRIPTION

Figure 1A:
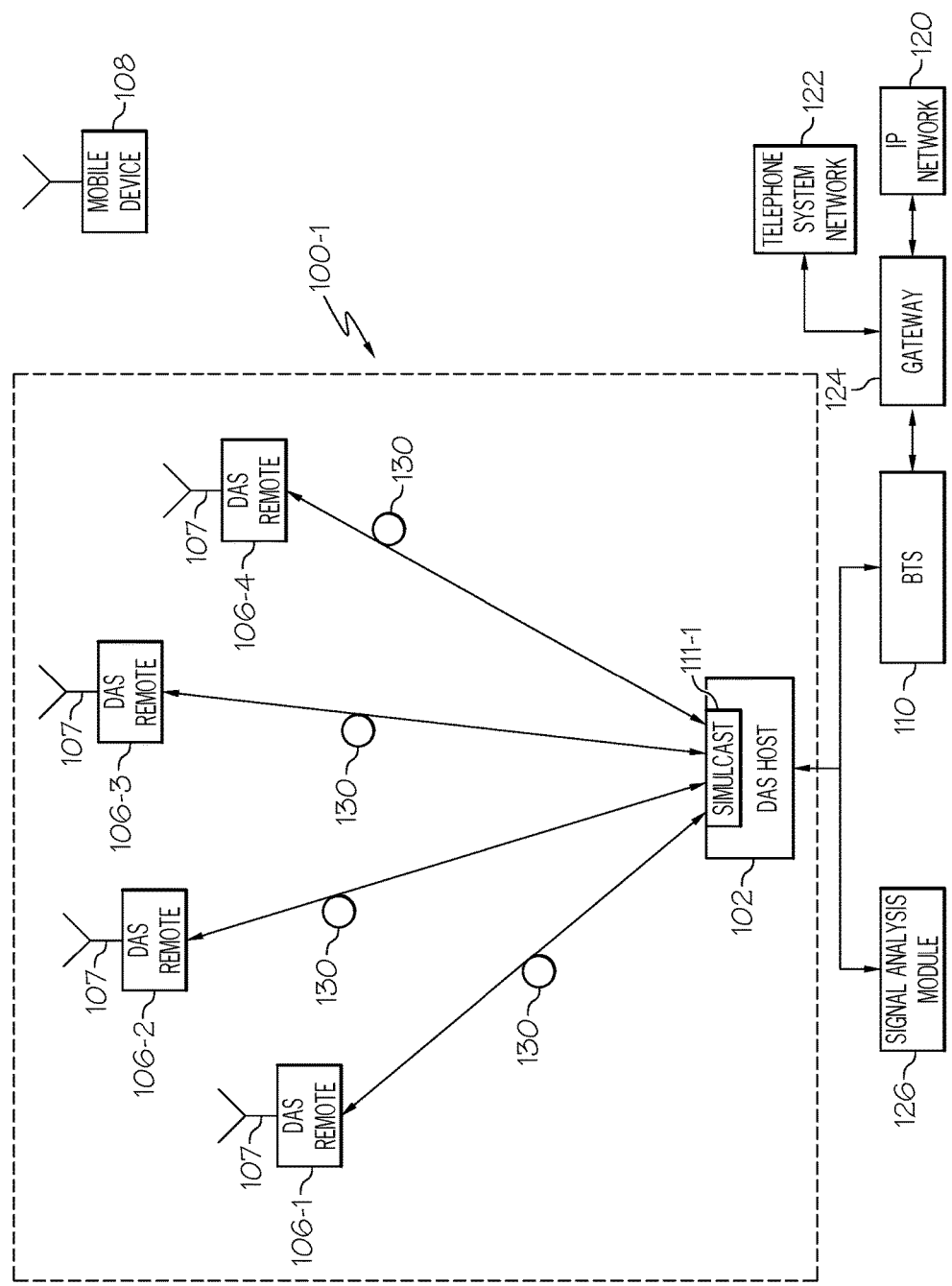

A significant shortcoming of simulcast DAS is that when multiple uplink signal paths are summed into a single combined signal, it becomes difficult to identify which of the multiple remote antennas was the source of a particular portion of the combined signal. In order to perform such tasks as triangulating the location of emergency calls, gathering data on usage patterns, identifying interfering signals, etc., an analysis module at the host location needs visibility to the signal from each individual remote antenna. Typically, providing host visibility to each individual signal path as been accomplished by separately transporting the uplink signal (sample stream) from each remote site, band, and antenna, in its original form, all the way back to the host location. At the host, each of these sample streams would be individually converted back to RF, and each of the resulting signals are separately made available on a dedicated RF connection to the appropriate analysis module. The host would then combine the signals together, by the use of RF combining, for presentation to the base station.

This strategy of obtaining individual signals multiplies the cost of the RF conversion hardware at the host by the number of antennas, adds the cost and signal degradation associated with the RF combining hardware, and greatly increases the total transport bandwidth required, which in turn increases the cost of transport hardware and installed transport media. In addition, providing this visibility requires each uplink path to be carried intact from each remote antenna all the way back to the host in a "home run" or "star" topology, and does not allow for the implementation of simulcast modules at intermediate nodes or remote units. Consequently, there is a pressing need for a system and method that provide visibility at the host location to signals from individual remote antennas in a simulcast DAS, with minimal impact on hardware cost or total transport bandwidth requirements.

The subject matter presented herein provides for systems and methods that can provide visibility to an individual signal from a remote unit in a simulcast DAS. The systems and methods described herein enable such visibility by including a dedicated subset of the uplink resource blocks (also referred to herein as the "monitor path) for use by the individual signal (sample stream) to be analyzed. The monitor path comprises resource blocks in addition to the resource blocks used for "regular" uplink transport which are summed in a simulcast module. The host unit can instruct a desired remote unit to send a sample stream to be analyzed on the monitor path. The host unit can then obtain the sample stream to be analyzed from the monitor path and provide the sample stream to the signal analysis module. In some embodiments, the monitor path can be re-allocated at a later time period by the host unit to other remote units and/or other received signals such that different received signals from different remote units can be provided to the signal analysis module at different times. Such systems and methods can provide visibility at the host location to signals at individual remote antennas in a simulcast DAS with minimal impact on hardware cost or total transport bandwidth requirements. Such systems can also be used to provide visibility to a given subset of signals at one or more remote antennas in a simulcast DAS. Such systems and methods can work in multiple DAS topologies, including star, daisy-chain, and branch topologies, and which allows the use of summation modules in intermediate nodes and remote units.

Figure 1B:
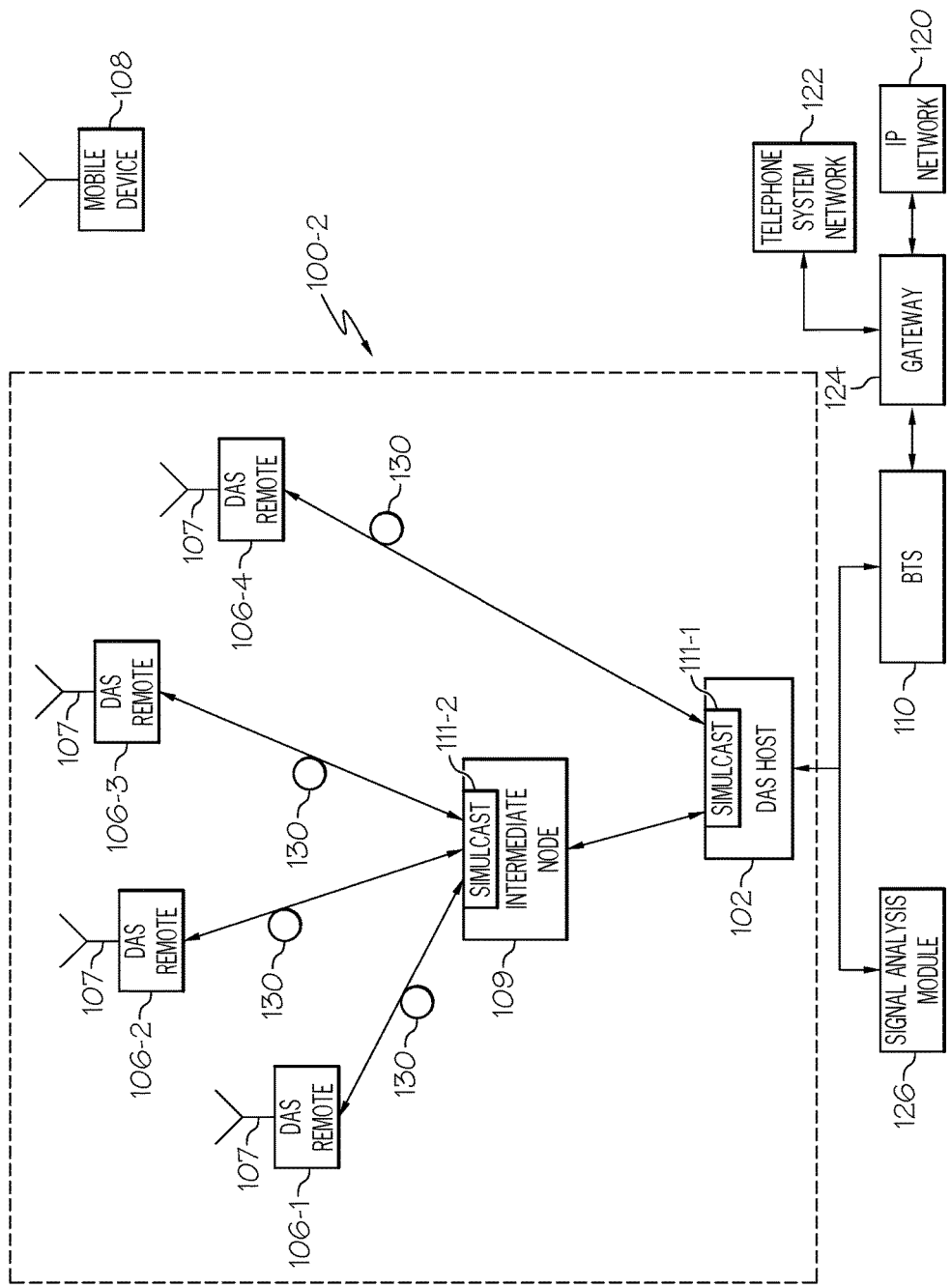
Figure 1C:
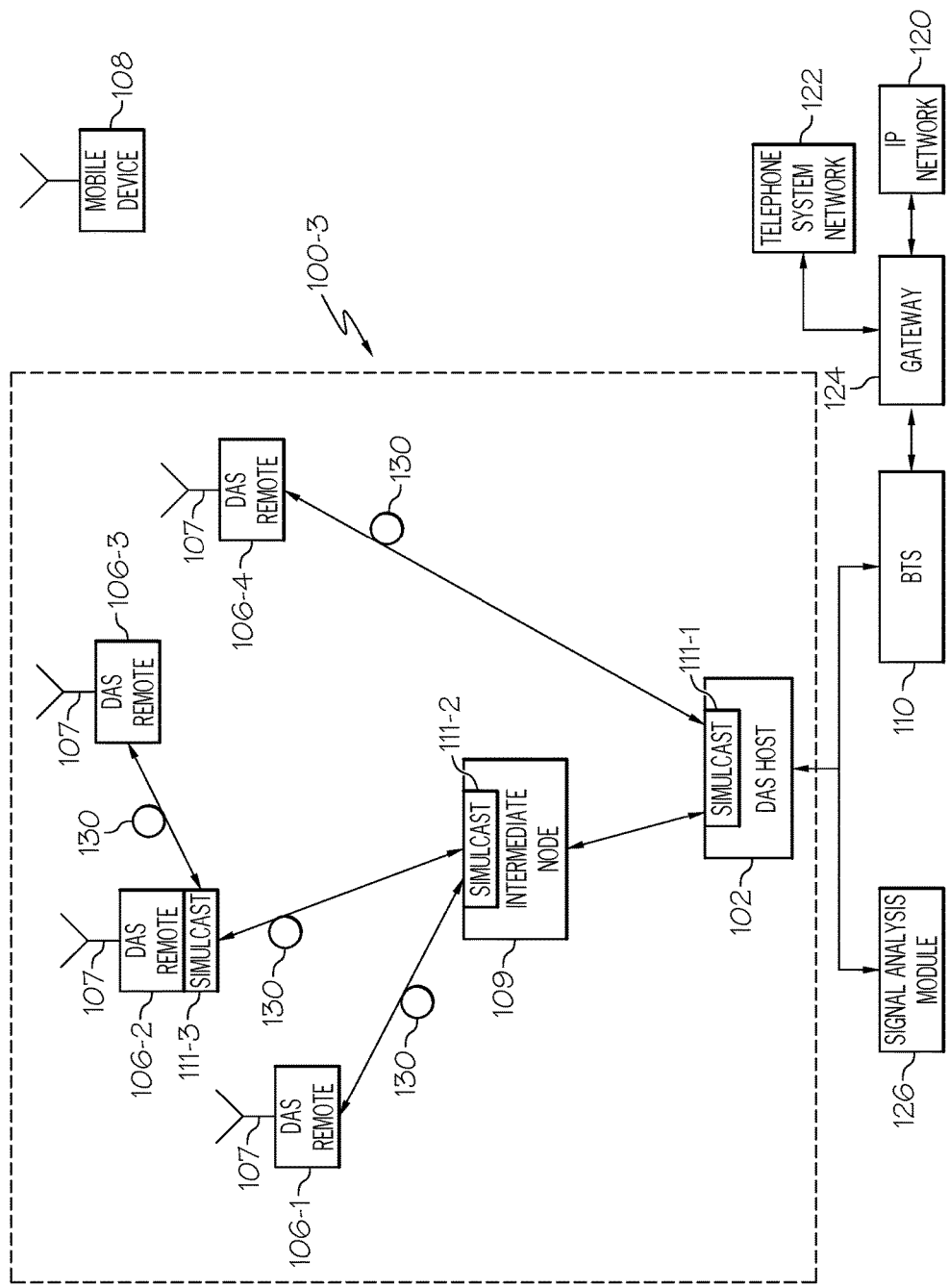

FIGS. 1A-1C illustrate examples of different DAS topologies in which the present subject matter can be used. FIG. 1A illustrates an example of a star topology, FIG. 1B illustrates an example of a branch topology, and FIG. 1C illustrate an example of a daisy-chain topology.

FIG. 1A is a block diagram of an example telecommunication system including a distributed antenna system (DAS) 100-1 having a simulcast module 111 in a host unit 102. Along with the host unit 102, DAS 100-1 includes a plurality of remote units 106 (106-1, 106-2, 106-3). The host unit 102 and remote units 106 are communicatively coupled together via a plurality of communication links 130.

In one embodiment, one or more of communication links 130 are fiber optic cable as indicated in FIG. 1A. Optionally, communication links 130 can comprise coaxial cable, a combination of both coaxial cable and fiber optic cable, wireless millimeter wave links (e.g. E Band/70 GHz radio), or wireless microwave radio links. A suitable transmission device (e.g., optical transceiver, millimeter signal transceiver, microwave radio transceiver) can be coupled to the ends of a communication link 130 included for transmission over a given medium.

A remote unit 106 includes electronic components to wirelessly transmit and receive modulated radio frequency (RF) communications via antenna 107 with one or more mobile devices 108. Host unit 102 is coupled to at least one base transceiver station (BTS) 110. BTS 110 communicates voice and other data signals between the respective host unit 102 and a larger communication network via a gateway 124 coupled to a telephone system network 122 (for example, the public switched telephone network and/or wireless service provider networks) and an internet protocol (IP) network 120, such as the Internet. In one embodiment, DAS 100-1 comprises part of a cellular telephone network and mobile devices 108 are cellular telephones. BTS 110 and host unit 102 may be interconnected via coaxial cable, fiber optic cable, wireless communication links, or any combination thereof. BTS 110, host unit 102, and remote units 106 can be configured to process communication signals for multiple bands and multiple modulation schemes concurrently.

DAS 100-1 comprises a digital DAS. That is, the transport signals sent between host unit 102 and remote units 106 over communication links 130 include digital sample streams comprised of digital samples corresponding to an RF bandwidth. The digital samples in a digital sample stream can comprise digital representations of the RF bandwidth or digital representations of an IF or baseband version of the RF bandwidth. Further, the digital samples can be real samples, or pairs of complex (i.e., in-phase (I) and quadrature (Q)) samples. An uplink digital sample stream is generated by digitizing an RF bandwidth and a downlink digital sample stream is generated for conversion into an RF bandwidth.

In the uplink, an RF bandwidth, which can include signals from one or more mobile devices 108, is sensed at each of the remote units 106. Each remote unit 106 generates an uplink transport signal to send over their respective communication link 130 based on the RF bandwidth sensed. To generate the uplink transport signal a remote unit 106 obtains digital samples corresponding to a respective RF bandwidth received to form a digital sample stream. The remote unit 106 then generates its uplink transport signal by modulating the digital sample stream (possibly along with other digital sample streams) on a carrier. The remote units 106-1, 106-2, 106-3 each send their respective uplink transport signals to the host unit 102. For example, if an RF bandwidth in the 900 MHz band is sensed at the antenna 107 of remote unit 106-1, the remote unit 106-1 samples either the RF bandwidth directly, an IF signal based on the RF bandwidth, or a baseband signal based on the RF bandwidth, to generate a digital sample stream. The remote unit 106-1 then generates an uplink transport signal including the digital sample stream and sends the uplink transport signal to the host unit 102. The host unit 102 receives the uplink transport signal and provides an uplink signal to the BTS 110 based on the digital sample stream in the uplink transport signal. The BTS 110 can then process the uplink signal in order to perform demodulation and obtain the data from the RF bandwidth in the 900 MHz band sensed at the remote unit 106-1. The uplink signal sent from the host unit 102 to the BTS 110 can consist of baseband digital samples from the digital sample stream in the uplink transport signal or can comprise an RF or IF signal generated from the digital sample stream.

In the downlink, a downlink signal from the BTS 110 can be an RF bandwidth for transmission to one or more mobile devices 108, in which case the host unit 102 generates digital samples corresponding to the RF bandwidth to form a digital sample stream (e.g., a stream of I/Q samples) and generates downlink transport signal(s) from the digital sample stream. In another example, a downlink signal from the BTS comprises baseband digital samples corresponding to an RF bandwidth. In such an example, the host unit 102 can generate the downlink transport signal(s) from the baseband digital samples. In any case, the host unit 102 receives one or more downlink signals from the BTS 110 and generates a plurality of downlink transport signal, which include digital sample streams based on the one or more downlink signals. Each remote unit 106 receives its respective downlink transport signal and generates an RF bandwidth from its downlink transport signal. The remote unit 106 then radiates the RF bandwidth from an antenna 107 coupled to the remote unit 106. For example, if it is desired to transmit an RF bandwidth in the 900 MHz band from remote unit 106-1, then the host unit 102 can generate a downlink transport signal including a digital sample stream corresponding to the RF bandwidth in the 900 MHz band and send the downlink transport signal to the remote unit 106-1. Upon receiving the downlink transport signal from the host unit 102, the remote unit 106-1 can generate the RF bandwidth in the 900 MHz band from the digital sample stream and radiate the RF bandwidth from its antenna 107. In the downlink, the BTS 110 generates one or more downlink signals and sends the one or more downlink signals to the host unit 102. The host unit 102 generates a plurality of downlink transport signals from the one or more downlink signals and sends each of the plurality of downlink transport signals to a different remote unit 106.

Host unit 102 is also coupled to one or more signal analysis modules 126. The signal analysis module 126 is configured to analyze signals received at the remote units 106. For example, the signal analysis module 126 can comprise a position measurement device that is configured to determine a location of a mobile device 108 whose signals are received by one or more of the remote units 106. In an example, the signal analysis module 126 can comprise a self-organization monitor configured to track usage and interference patterns and use that information to direct wireless capacity and coverage where it is needed. The host unit 102 can pass a signal analysis signal corresponding to a monitor path portion of the uplink transport signal to the signal analysis module 126 for analysis. The signal analysis signal can include a digital sample stream or an analog intermediate frequency (IF) signal. More detail regarding the signal analysis module 126 is provided below.

The host unit 102 is configured to simulcast signals with multiple remote units 106, and includes the simulcast module 111-1 to implement the simulcasting. The simulcast module 111-1 is configured to generate multiple identical digital sample streams for downlink simulcast and combine multiple digital sample streams for uplink simulcast. To generate multiple digital sample streams for downlink simulcast, the simulcast module 111-1 receives a digital sample stream processed by the host unit 102 and generates multiple copies of the digital sample stream. Each of the digital sample streams is then incorporated into a different downlink transport signal sent to a different downstream destination (e.g., a different remote unit 106). To combine multiple digital sample streams, the simulcast module 111-1 receives the multiple digital sample streams, each from a different uplink transport signal and, therefore a different downstream source (e.g., a different remote unit 106). The simulcast module 111-1 arithmetically sums the digital samples from each of the digital sample streams to generate a single (summed) digital sample stream. The single digital sample stream is sent to an upstream destination (e.g., for further processing within the host unit 102).

FIG. 1B is a block diagram of another example telecommunication system including a distributed antenna system (DAS) 100-2 having a first simulcast module 111-1 in a host unit 102 and second simulcast module 111-2 in an intermediate node 109. FIG. 1B illustrates many of the same components as FIG. 1A. Components in FIG. 1B that numbered the same as components in FIG. 1A function the same as those components.

In DAS 100-2 of FIG. 1B, the host unit 102 via simulcast module 111-1 is configured to simulcast along two uplink and downlink transport signals. The first uplink and downlink transport signals are sent between the host unit 102 and a fourth remote unit 106-4. The second uplink and downlink transport signals are sent between the host unit 102 and an intermediate node 109.

The intermediate node 109 is coupled between the remote units 106-1, 106-2, 106-3 and the host unit 102 and relays signals therebetween. Intermediate node 109 distributes downlink signals from the host unit 102 to the remote units 106-1, 106-2, 106-3 and distributes uplink signals from the remote units 106-1, 106-2, 106-3 to the host unit 102. An intermediate node 109 is sometimes referred to as an "expansion unit" or an "expansion hub" since it is often used to expand the geographical area and/or number or remote units that a given host unit can service. The intermediate node 109 is communicatively coupled to the host unit 102 and the remote units 106-1, 106-2, 106-3 via a plurality of communication links 130. In one embodiment, one or more of communication links 130 are fiber optic cable as indicated in FIG. 1B. Optionally, communication links 130 can comprise coaxial cable, a combination of both coaxial cable and fiber optic cable, wireless millimeter wave links (e.g. E Band/70 GHz radio), or wireless microwave radio links. A suitable transmission device (e.g., optical transceiver, millimeter signal transceiver, microwave radio transceiver) can be coupled to the ends of a communication link 130 included for transmission over a given medium.

The intermediate node 109 is configured to simulcast signals with the remote units 106-1, 106-2, and 106-3, and includes the simulcast module 111-2 to implement the simulcasting. The simulcast module 111-2 is configured to generate multiple identical digital sample streams for downlink simulcast and combine multiple digital sample streams for uplink simulcast. To generate multiple digital sample streams for downlink simulcast, the simulcast module 111-2 obtains a digital sample stream from the downlink transport signal from the host unit 102 and generates multiple copies of the digital sample stream. Each of the digital sample streams is then incorporated into a different downlink transport signal and is sent to a different remote unit 106-1, 106-2, 106-3. To combine multiple uplink digital sample streams, the simulcast module 111-1 receives the multiple digital sample streams, each from a different uplink transport signal from a different remote unit 106-1, 106-2, 106-3. The simulcast module 111-2 arithmetically sums the digital samples from each of the digital sample streams to generate a single (summed) digital sample stream. The single digital sample stream is sent to the host unit 102 in an uplink transport signal.

FIG. 1C is a block diagram of another example telecommunication system including a distributed antenna system (DAS) 100-3 having a first simulcast module 111-1 in a host unit 102, a second simulcast module 111-2 in an intermediate node 109, and a third simulcast module 111-3 in a remote unit 106-3. FIG. 1C illustrates many of the same components as FIGS. 1A and 1B. Components in FIG. 1C that numbered the same as components in FIGS. 1A and 1B function the same as those components.

In DAS 100-3 of FIG. 1C, the intermediate node 109 via simulcast module 111-2 is configured to simulcast along two uplink and downlink transport signals. The first uplink and downlink transport signals are sent between the intermediate node 109 and a first remote unit 106-1. The second uplink and downlink transport signals are sent between the intermediate node 109 and a second remote unit 106-2.

In DAS 100-3, the second remote unit 106-2 is also configured to simulcast with itself and another, daisy-chained remote unit 106-3. The simulcasting by the second remote unit 106-2 is simulcasting the signals sent and received at the second remote unit 106-2 with the signals sent and received at the third remote unit 106-3. The second remote unit 106-2 includes a third simulcast module 111-3 to implement the simulcasting. The simulcast module 111-3 is configured to generate multiple identical digital sample streams for downlink simulcast and combine multiple digital sample streams for uplink simulcast. To generate multiple digital sample streams for downlink simulcast, the simulcast module 111-3 obtains a digital sample stream from the downlink transport signal from the intermediate node 109 and generates multiple copies of the digital sample stream. A first copy of the digital sample stream is then used by the remote unit 106-2 to generate an RF bandwidth for radiation therefrom. A second copy of the digital sample stream is incorporated into a downlink transport signal and is sent to the third remote unit 106-3. To combine multiple uplink digital sample streams, the simulcast module 111-3 obtains a first digital sample stream from an uplink transport signal from the third remote unit 106-3 and obtains a second digital sample stream from an RF bandwidth sensed by the second remote unit 106-2. The simulcast module 111-3 arithmetically sums the digital samples from each of the digital sample streams to generate a single (summed) digital sample stream. The single digital sample stream is sent in the intermediate node 109 in an uplink transport signal.

It should be understood that the three DAS configurations illustrated in FIGS. 1A, 1B, and 1C are only examples illustrating different locations of simulcast modules 111; and that the description herein applies to DAS configuration in addition to those shown in FIGS. 1A, 1B, and 1C, including different number and/or configurations of host unit(s) 102, intermediate node(s) 109, and remote unit(s) 106, and more or fewer locations of simulcasting modules 111.

As mentioned above, the processes of summing uplink digital sample streams for simulcasting obfuscates the original digital sample streams such that devices that receive the summed digital sample streams cannot ascertain the original digital sample streams. As a result, an upstream device such as the signal analysis module 126 cannot analyze signals sensed at an individual remote unit 106 since the original digital sample stream has been obfuscated when it was summed for simulcasting back to the host unit 102. Information on a signal sensed at an individual remote unit 106 can be valuable, such as for determining a location of a mobile device and for analysis in self-organizing networks. The subject matter described herein addresses this concern, among other things, by providing a means, in a DAS that performs simulcasting, for obtaining a digital sample stream that was originally created by a remote unit 106.

Figure 2A:
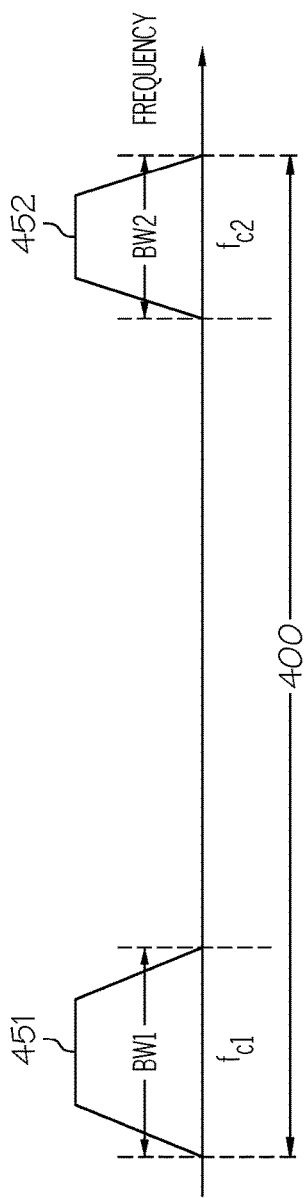
FIGS. 2A and 2B illustrate an example mapping of RF spectral regions to transport frame timeslots.

FIG. 2A illustrates an example RF spectrum 400. RF spectrum 400 can be composed of multiple spectral regions (RF bandwidths) 451, 452. A spectral region 451, 452 comprises a range of frequencies and the range can be defined in any manner, such as based on frequency bands containing signals of interest. For example, spectral region 451 can correspond to the 850 MHz cellular signals of signals and spectral region 452 can correspond to the 1900 MHz PCS signals.

Figure 2B:
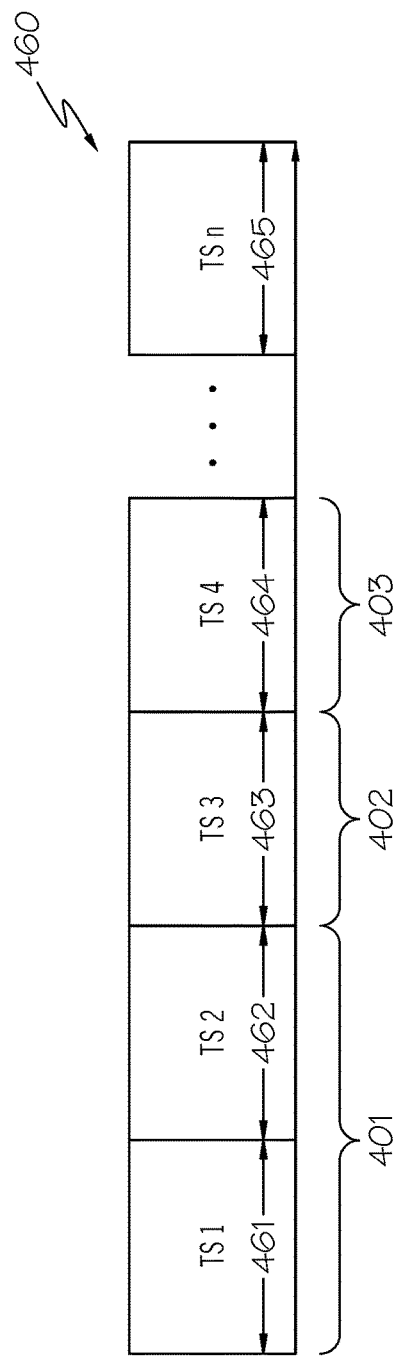

FIG. 2B illustrates an example set of resource blocks 460 used for uplink transport signals on a communication link 130. In this embodiment, the resource blocks consist of one or more regularly repeating time slots within a single serial bit stream. In other examples, however, the set of resource blocks can consist of one or more different frequencies, wavelengths, or communication mediums (e.g., fibers), or can consist of a combination of the above elements such as blocks defined in both frequency and time.

As shown in FIGS. 1A, 1B, and 1C, each communication link 130 communicatively coupling a remote unit 106, intermediate node 109, or host unit 102 to another remote unit 106, intermediate node 109, or host unit 102 in a DAS 100 is distinct, and therefore provides a distinct set of resource blocks 460. In an example, all uplink transport signals on all communication links 130 of a DAS 100 are sent according to a common arrangement of resource blocks. FIG. 2B illustrates such a common arrangement of resource blocks 460. Sending all transport signals such that they conform to a common arrangement of resource blocks 460, enables simulcasting to be more easily implemented since the digital sample streams of the uplink transport signals can be easily summed and the digital sample streams of the downlink transport signal can be easily split. The common arrangement of resource blocks 460 used for uplink transport signal on a communication link 130 is also referred to herein simply as the "common arrangement" 460.

The common arrangement of resource blocks 460 is allocated based on the RF band or service for which the DAS is configured. In particular, digital sample streams corresponding to different spectral regions, or corresponding to differing antennas in the same spectral region (such as in a received diversity antenna system), are sent over different resource blocks of the common arrangement 460. Since each communication link 130 implements a distinct instantiation of the common arrangement 460, a digital sample stream corresponding to a given spectral region and/or antenna is on the same resource blocks of its common arrangement 460. The host unit 102 controls the common arrangement 460 by allocating resource blocks to spectral regions and/or differing antennas. The host unit 102 can enable consistent use of the common arrangement 460 throughout the communication links 130 by commanding the remote units 102 to send transport signals having like portions of the RF spectrum 400 on like resource blocks of the common arrangement 460. For example, a first subset of resource blocks 401 of the common arrangement 460 can be used for digital sample streams corresponding to the first spectral region 451 and a second subset of resource blocks 402 of the common arrangement 460 can be used for digital sample streams corresponding to the second spectral region 452. A third subset of resource blocks 403 (also referred to herein as the "monitor path") of common arrangement 460 is dedicated for signal analysis and is explained in more detail below.

As mentioned above, all communication links 130 in the DAS 100 conform to this common arrangement 460. Thus, each of the remote units 106 send transport signals with like spectral regions (digital sample streams corresponding to the spectral regions) on like resource blocks of their corresponding common arrangement 460. In the example of FIGS. 2A and 2B, therefore, each of the remote units 106 send uplink digital sample streams corresponding to the first spectral region 451 on the first subset of resource blocks 401 of their respective common arrangement 460, and uplink digital sample streams corresponding to the second spectral region 452 on the second subset of resource blocks 402 of their respective common arrangement 460. Since the uplink transport signals are composed of digital sample streams, sending uplink transport signals corresponding to like portions of the RF spectrum 400 on like resource blocks of the common arrangement 460 enables easier summation of transport signals. For example, in order to sum a first transport signal from remote unit 106-1 with a second transport signal from remote unit 106-2, a simulcast module 111 can arithmetically sum the digital samples from the first subset of resource blocks 401 from the remote unit 106-1 with the digital samples from the first subset of resource blocks 401 from the remote unit 106-2. If further transport of is needed, the summation can generate a new subset of resource blocks for a new transport signal to send according to the common arrangement 460, where the new subset of resource blocks corresponds to the summation of the two first subsets of resource blocks 401. Similarly, the simulcast module can arithmetically sum the digital samples from the second subset of resource blocks 402 from the remote unit 106-1 with the digital samples from the second subset of resource blocks 402 from the remote unit 106-2. Again, if further transport is needed, this can generate a new subset of resource blocks for the new transport signal. The simulcast module 111 can similarly sum other resource blocks of the transport signals.

In the example of FIG. 2B, the common arrangement 460 is apportioned into frames which each comprise a plurality of timeslots 461-465, such that a timeslot corresponds to a resource block. For example, a digital sample stream corresponding to a first spectral region 451 can be placed on the first and second time slots 461, 462 of each frame, and a digital sample stream corresponding the second spectral region 452 can be placed on the third time slot 463 of each frame. To sum to transport signals as discussed above, the first and second timeslots 461, 462 (corresponding to first subset of resource blocks 401) of a first transport signal can be summed with the first and second timeslots 461, 462 of a second transport signal. The other timeslots can be similarly summed.

Since, in this example, the common arrangement 460 is allocated based on spectral regions, the host unit 102 can distribute digital sample streams in the uplink transport signals based on the resource blocks of the common arrangement 460 in which the digital sample streams reside. For example, a first BTS 110 can be configured to process signals in the first spectral region 451 and a second BTS 110 can be configured to process signals in the second spectral region 452. Accordingly, the host unit 102 can provide uplink signals based on the digital sample stream in the first subset of resource blocks 401 to the first BTS 110 and can provide uplink signals based on the digital sample stream in the second subset of resource blocks 402 to the second BTS 110. As mentioned above, the common arrangement 460 also includes a subset of resource blocks 403 (the monitor path) that are allocated for signal analysis. As such, the host unit 102 can provide a signal analysis signal based on the digital sample stream in the monitor 403 to the signal analysis module 126.

In this example, each of the remote units 106 has the ability to insert a digital sample stream into the monitor path 403 of their respective transport signal. The digital sample stream sent from each remote unit could be a copy of one of the main sample streams, a lower sample rate representation of a narrow bandwidth subsection of one of the regular RF transport channels, a digital sample stream from an independent RF front end not associated with any of the regular RF transport channels, or it could be a "null" signal in which each sample value is force to zero.

The host unit 102 can control which one or more remote units 106 provide a digital sample stream on the monitor path 403 based on commands to the plurality of remote units. In particular, the host unit 102 can command a subset of the remote units 106 to provide a digital sample stream on the monitor path 403 of their respective uplink transport signal and a the rest of the remote units 106 to provide a null signal onto the monitor path 403 of their respective uplink transport signal. The host unit 102 can then provide the digital sample stream on the monitor path 403 it receives to the signal analysis module 126 enabling the signal analysis module 126 to analyze signals from the subset of the remote units 106. This subset of remote units 106 can include one or more than one of the remote units 106.

Each simulcast module 111 performs uplink summation on the monitor path 403 of its received uplink transport signal in the same way the regular paths (subset 401 and subset 402) are summed. However, the only remote units 106 that contribute to the monitor path 403 are those which are set to provide a digital sample stream on the monitor path 403. The remote units 106 that are set to provide a null signal onto the monitor path 403 do not contribute.

In an example, the signal analysis module 126 can provide a request indicative of which one or more remote units 106 the signal analysis module 126 would like to receive signals from. In an example, this request can specifically identify the one or more remote units 106 from which the signal analysis module 126 would like to receive signals. In other examples, the request can provide information from which the host unit 102 can determine the one or more remote units 106. Since the signal analysis signal is based on the monitor path 403, when the signal analysis signal is provided to the signal analysis module 126, the signal analysis module 126 receives the requested signals.

In an example the subset of remote units includes only remote unit 106-1. In response to a request from the signal analysis module 126, the host unit 102 can send a command to the subset of remote units (e.g., remote unit 106-1) instructing the subset (e.g., remote unit 106-1) to send the desired digital sample stream on the monitor path 403 of their respective uplink transport signal. The host unit 102 also sends commands to the remote units 106 not in the subset (e.g., remote units 106-2, 106-3, 106-4), instructing them to send zeros (no data) on the monitor path 403 of their respective uplink transport signal. When the remote units 106 implement the commands, the monitor path 403 as received at the host unit 102 will contain a sum of the digital sample streams from each of the subset of remote units 106 (e.g., remote unit 106-1), and will not contain information from the other remote units (e.g., remote units 106-2, 106-3, and 106-4). In this way, the signal analysis module 126 can obtain information on signals from a specified subset of one or more remote units 106.

Along with the command(s) to send a digital sample stream on the monitor path 403, the host unit 102 can also send a command instructing the subset of remote units 106 as to which portion of the RF spectrum and/or which antenna's signals the subset of remote units 106 are to send on the monitor path 403. That is, the command can instruct the remote units 106 to send digital sample streams corresponding to a specific portion of the RF spectrum and/or antenna's signals on the monitor path 403. The specific portion of the RF spectrum and/or antenna's signals can be based on a request from the signal analysis module 126. The specific portion of the RF spectrum and/or antenna's signals sent on the monitor path 403 can also be known a priori such as when the signal analysis module 126 requests signals corresponding to emergency calls (e.g., 911) and the mobile devices 108 are configured to send these emergency calls within a particular frequency band.

In an example, the specified signal(s) sent on the monitor path 403 is a duplicate of data in other resource block(s) of the common arrangement 460. For example, if the signal analysis module 126 requests to receive signals from spectral region 451, the remote unit 106-1 can send a digital sample stream corresponding to spectral region 451 on the monitor path 403. Spectral region 451, however, can also be spectrum that is being received by the BTS 110. In order to provide a digital sample stream of spectral region 451 to both a BTS 110 and the signal analysis module 126, the remote unit 106-1 can generate two copies of a digital sample stream corresponding to spectral region 451. A first of the two copies of a digital sample stream can be sent on the first subset of resource blocks 401 such that the information in the first digital sample stream is provided to a BTS 110. A second of the two copies of a digital sample stream can be sent on the monitor path 403 such that the information in the second digital sample stream is provided to the signal analysis module 126.

In some examples, the host unit 102 can repeatedly modify which remote unit(s) 106 sends a digital sample stream on the monitor path 403, such that signals are received at the signal analysis module 126 from different remote units 106 over time. For example, the host unit 102 can scan through the remote units 106 such that each remote unit 106 of the plurality of remote units 106 is individually allocated the monitor path 403 for a period of time. In this way, the signal analysis module 126 can analyze signals received by each remote unit 106 individually. This can be used if the signal analysis module 126 is gathering timing and signal strength information from multiple mobile signals, to be used as needed, for responding to position determination requests. Many position determination algorithms are known in the art such as using the coverage area of the remote unit 106 receiving the strongest signal as the area in which the mobile device 108 is present. If the signal analysis module 126 includes a self-organization monitor, the self-organization monitor can track the usage and interference patterns using these methods.

The common arrangement 460 can include other resource blocks in addition to the first subset 401, second subset 402, and monitor path 403. Also, in some examples, a given remote unit 106 may send digital sample streams on some, but not all of the resource blocks of the common arrangement 460. For example, first remote unit 106-1 may send digital sample streams on the first subset 401, but not the second subset 402 of the common arrangement 460. For example, if remote unit 106-1 is not configured to receive signals within the second spectral region 452, the remote unit 106-1 can send a null signal in the second subset 402 of the common arrangement 460. The null signal will have no effect when the transport signals from the remote unit 106-1 are summed with other transport signals.

In the example shown in FIG. 2B, the common arrangement 460 is apportioned into a plurality of timeslots 461-465 which together make up a digital transport frame. Each spectral region 451, 452 maps to one or more of the timeslots 461-465. In this example, time slots 461 and 462 are allocated to spectral region 451 and time slot 463 is allocated to spectral region 452. Time slot 464 is allocated for signal analysis. The number of timeslots 461-465 allocated can be based on the amount of bandwidth required to send the desired digital sample stream from a given spectral region 451, 452 or for signal analysis. In other examples, the common arrangement 460 can be apportioned by frequency division, or other means including a combination of means. A similar common arrangement can be implemented for downlink transport signals, except without the bandwidth allocated for signal analysis.

Figure 3:
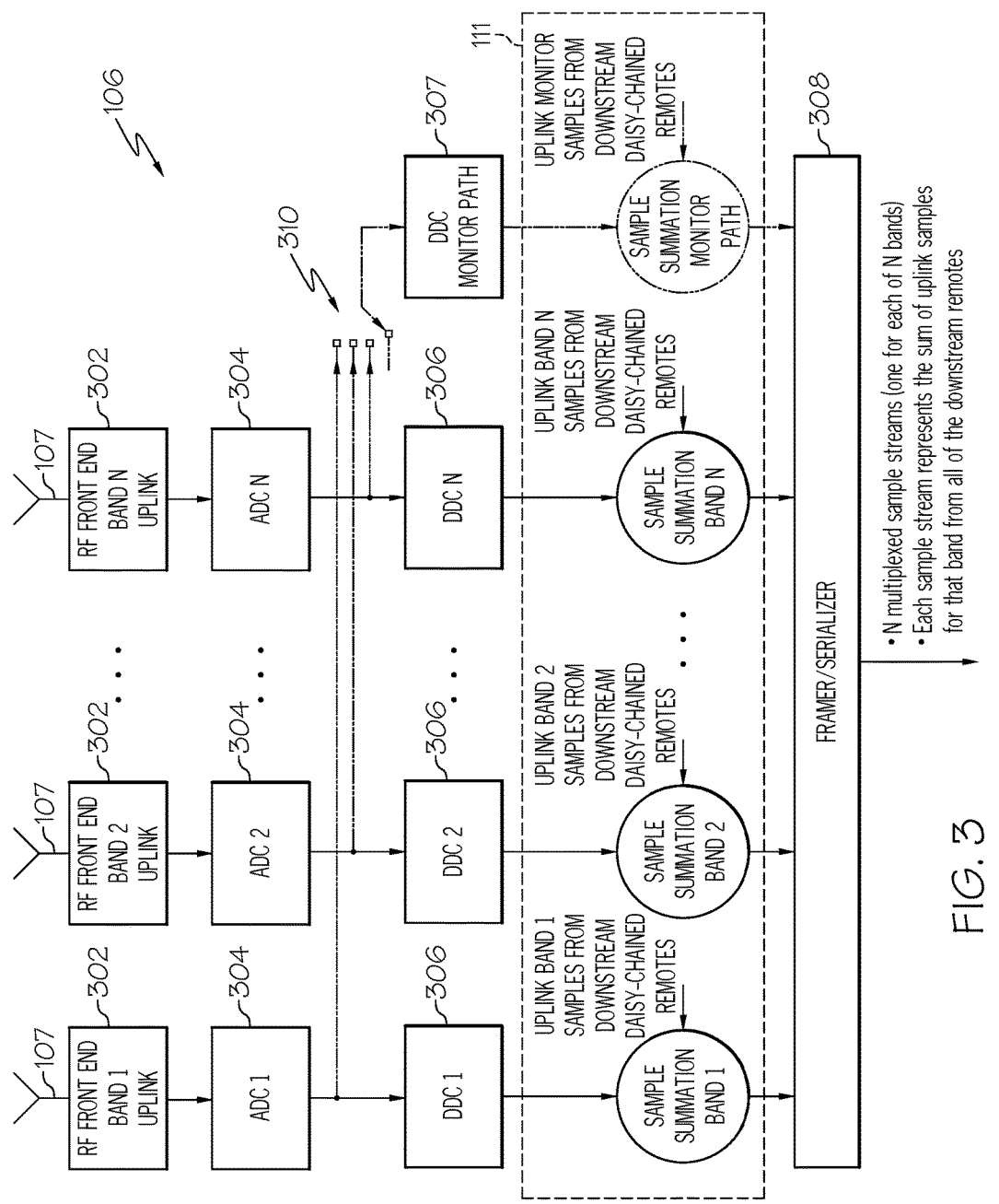
FIG. 3 is a block diagram of an example of the uplink functions performed by a remote unit including a simulcast module.

FIG. 3 is a block diagram of one example of the uplink functions performed by a remote unit 106 including a simulcast module 111. In this example, remote unit 106 operates on multiple RF bandwidths concurrently, and is often referred to as a multiband remote unit 106. Remote unit 106 can sense RF bandwidth with one or more antennas 107. Remote unit 106 includes a plurality of RF front ends 302 for different spectral regions (bands) operated on by the remote unit 106. Each RF front end 302 operates on its respective RF bandwidth and passes the resulting signal to an analog-to-digital converter (ADC) 304. The analog-to-digital converter samples the signal to generate a digital sample stream based thereon. Each digital sample stream is passed to a digital down converter 306 which down-converts the sample stream and passes the digital sample stream to a simulcast module 111. The simulcast module 111 sums each digital sample stream with a digital sample stream for a corresponding spectral region from a downstream daisy-chained remote unit 106. The summed digital sample streams are provided to a framer/serializer 308 which places each digital sample stream in its allocated time slot(s) in a frame of the uplink transport signal. The framer/serializer 308 multiplexes the digital sample streams together. A signal including the frames generated by the framer/serializer 308 can then be transmitted as an uplink transport signal.

As shown, the remote unit 106 also includes a monitor path digital down converter 307 to provide a digital sample stream for the monitor path 403. A switch 310 is configured to couple the monitor path digital down converter 307 to receive a selected digital sample stream from a corresponding ADC 304 or to receive a null signal. Accordingly, if the host unit 102 instructs the remote unit 106 to provide a digital sample stream corresponding to a first spectral region 451 (Band 1) on the monitor path 403, the remote unit 106 sets the switch 310 to couple the output of the ADC 1 to the monitor path digital down converter 307. Similar to the other digital down converters 306, the monitor path digital down converter 307 down converts the digital sample stream and passes the digital sample stream to the simulcast module 111. The simulcast module 111 sums the digital sample stream from the monitor path digital down converter 307 with digital sample streams on the monitor path 403 from downstream daisy-chained remote units 106. This summed monitor path digital sample stream is then provided to the framer/serializer 308 for placement into the time slot(s) allocated for the monitor path 403.

In one embodiment, a first digital down-converter 306 is programmed to filter out all signals except those in spectral region 451 (e.g., Band 1). For example, the first digital down-converter 306 can be programmed with both the center frequency (shown as $f_{c1}$) and the bandwidth BW1 of the first spectral region 451. The first digital down-converter 306 applies a band-pass filter to the digital sample stream from the complete RF spectrum, allowing only the data corresponding to the spectral region $f_{c1}-\frac{1}{2}(BW1)$ to $f_{c1}+\frac{1}{2}(BW1)$ to pass. The first digital down-converter 306 then converts the IF digital samples in the digital sample stream corresponding to the first spectral region 451 into baseband digital samples by re-sampling the IF digital samples from the initial sampling rate to a first sampling rate selected based on the size of BW1. The first sampling rate can be used to determine the number of timeslots used to transport the baseband digital RF samples corresponding to spectral region 451.

In the same way, a second digital down converter 306 is programmed with both the center frequency (shown as $f_{c2}$) and the bandwidth BW2 of the second spectral region 452 (Band 2). The second digital down-converter 306 applies a band-pass filter to the IF digital samples of the complete RF spectrum, allowing only the data corresponding to the spectral region $f_{c2}-\frac{1}{2}(BW2)$ to $f_{c2}+\frac{1}{2}(BW2)$ to pass. The second digital down-converter 306 then converts the IF digital samples corresponding to the second spectral region 452 into baseband digital samples by re-sampling the IF digital samples from the initial sampling rate to a second sampling rate selected based on the size of BW2. The second sampling rate can determine the number of timeslots used to transport the baseband digital samples corresponding to spectral region 452.

Likewise, the monitor path digital down-converter 307 can be programmed with the center frequency of a specified spectral region (e.g., Band 1, 2, or N) and the bandwidth BW2 of the specified spectral region. As mentioned above, the specified spectral region can be set based on a priori knowledge (e.g., in some examples of emergency calls) or can be set based on a command from the host unit 102 indicating the center frequency and bandwidth to the processed. Upon receiving a command from the host unit 102 instructing the remote unit 106 to send the digital sample stream on the monitor path 403 of its uplink transport signal, monitor path digital down-converter 307 can be enabled (i.e., switched from a null signal to one of the digital sample streams from an ADC 304 with switch 310). Similar to the other digital down converters 306, the monitor path digital down-converter 307 can apply a band-pass filter to the IF digital samples of the complete RF spectrum, allowing only the data corresponding to the specified spectral region to pass. The monitor path digital down-converter 307 can then convert the IF digital samples corresponding to the specified spectral region into baseband digital samples by re-sampling the IF digital samples from the initial sampling rate to a third sampling rate. As mentioned above, the specified spectral region can include all or part of the spectral regions processed by other digital down converters 306. If the remote unit 106 is commanded to send a null signal (e.g., no data) on the monitor path 403, the monitor path digital down converter 307 can be disconnected, connected to send a null signal, or otherwise disabled.

In an example, the digital down-converters 306, 307, simulcast module 111, and the framer/serializer 308 are implemented with a processing device such as an FPGA. Since an FPGA is a field programmable device, it can be adjusted to meet changing needs of the end user. For example, the center frequencies and bandwidths of the digital down-converters 306, 307 can be individually reprogrammed in order to shift the locations of spectral regions that they process. The number of individual signal paths may be increased by configuring the FPGA with additional digital up-converters and digital down-converters. In one embodiment, a plurality of predefined configuration builds is stored in a memory, and the FPGA can be reconfigured by pushing a new build image onto the FPGA.

Figure 4:
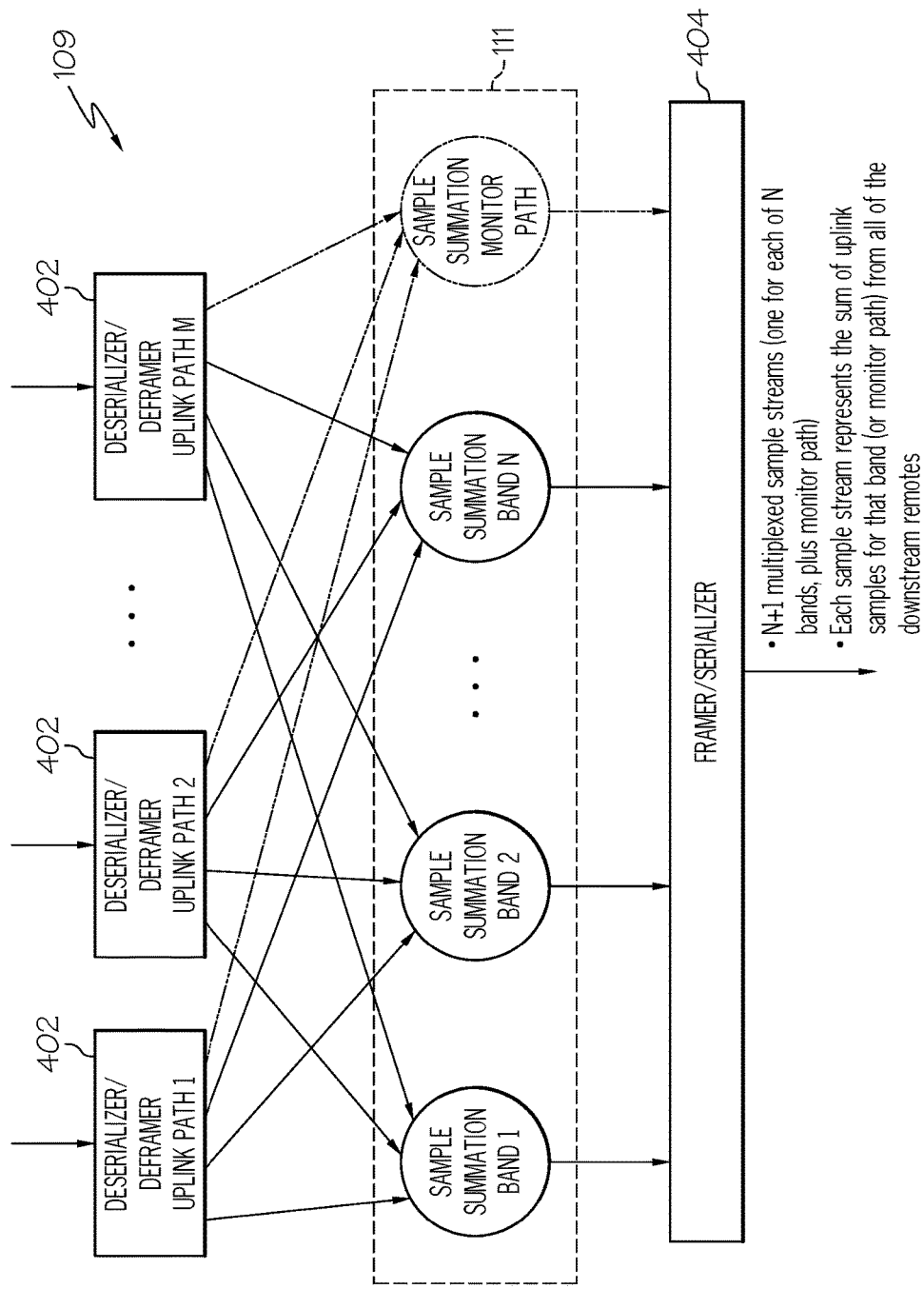
FIG. 4 is a block diagram of an example of the uplink functions performed by an intermediate node including a simulcast module.

FIG. 4 is a block diagram of one example of the uplink functions performed by an intermediate node 109 including a simulcast module 111. The intermediate node 109 includes a plurality of deserializer/deframers 402. Each deserializer/deframer 402 is coupled to receive a different uplink transport signal from a different downstream unit (e.g., a different remote unit 106). A deserializer/deframer 402 processes the uplink transport signal to deserialize and deframe it and reproduce the plurality of digital sample streams included therein. One (or more) of the plurality of digital sample streams corresponds to the monitor path 403. Each deserializer/deframer 402 then provides the one or more digital sample streams to the simulcast module 111. The simulcast module 111 receives each of the one or more digital sample streams from the plurality of deserializer/deframers 402 and sums the digital sample streams having a corresponding spectral region together. This summation includes summing the digital sample streams corresponding to the monitor path from each of the uplink transport signals received. The summed digital sample streams are provided to a framer/serializer 404 which places each digital sample stream in its allocated time slot(s) in a frame of the uplink transport signal. The framer/serializer 404 multiplexes the digital sample streams together. A signal including the frames generated by the framer/serializer 404 can then be transmitted as an uplink transport signal.

In an example, the deserializer/deframers 402, simulcast module 111, and the framer/serializer are implemented with a processing device such as an FPGA. Since an FPGA is a field programmable device, it can be adjusted to meet changing needs of the end user. The number of individual signal paths may be increased by configuring the FPGA with additional deserializer/deframers 402 and summation capabilities in simulcast module 111. In one embodiment, a plurality of predefined configuration builds is stored in a memory, and the FPGA can be reconfigured by pushing a new build image onto the FPGA.

Figure 5:
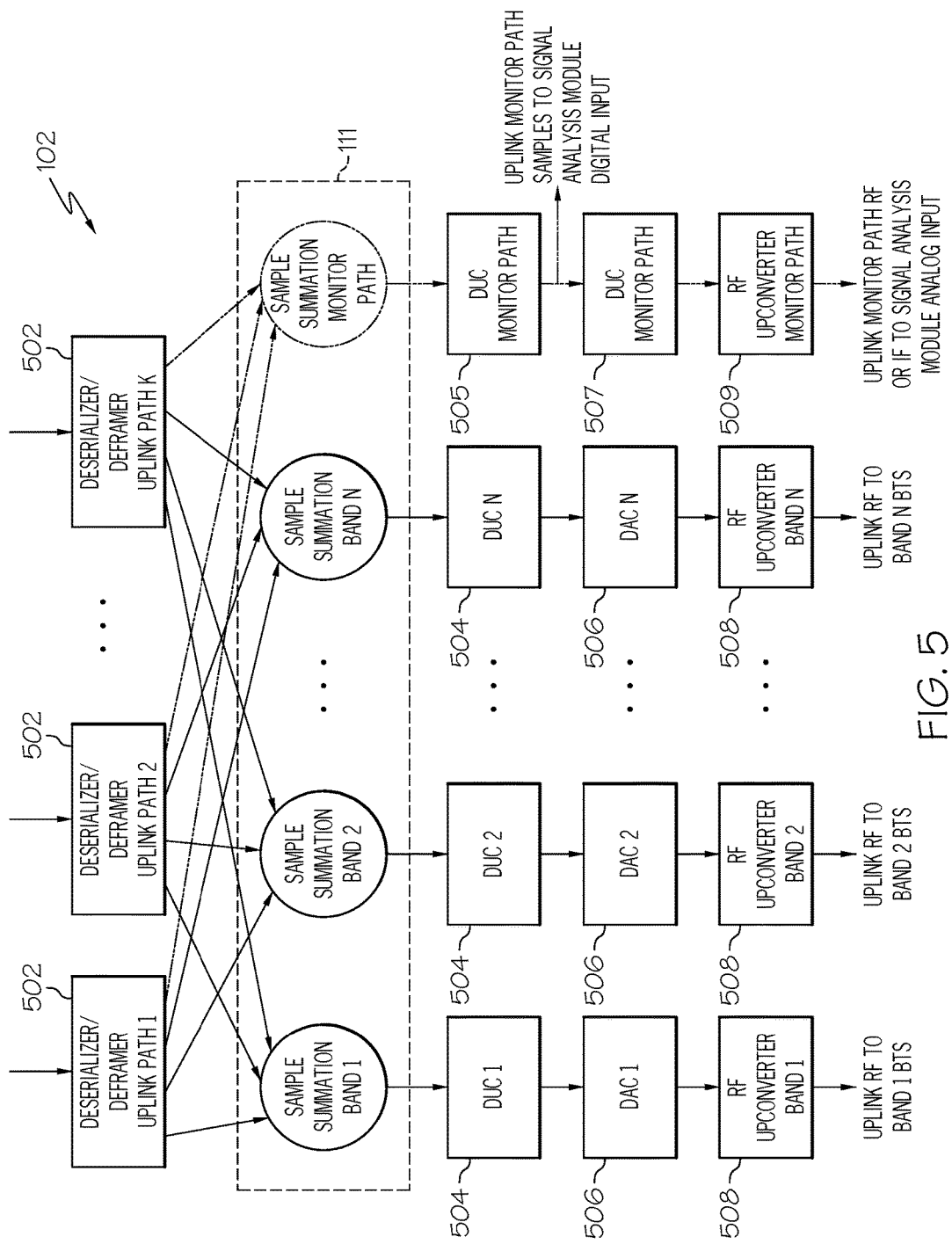
FIG. 5 is a block diagram of an example of the uplink functions performed by a host unit including a simulcast module.

FIG. 5 is a block diagram of one example of the uplink functions performed by a host unit 102 including a simulcast module 111. The host unit 102 includes a plurality of deserializer/deframers 502. Each deserializer/deframer 502 is coupled to receive a different uplink transport signal from a different downstream unit (e.g., a different remote unit 106 or intermediate node 109). A deserializer/deframer 502 processes the uplink transport signal to deserialize and deframe it and reproduce the plurality of digital sample streams included therein. One (or more) of the plurality of digital sample streams corresponds to the monitor path 403. Each deserializer/deframer 502 then provides the one or more digital sample streams to the simulcast module 111. The simulcast module 111 receives each of the one or more digital sample streams from the plurality of deserializer/deframers 502 and sums the digital sample streams having a corresponding spectral region together. This summation includes summing the digital sample streams corresponding to the monitor path 403 from each of the uplink transport signals received. Each of the summed digital sample streams is provided to a digital up-converter 504 for the spectral region (band) to which the digital sample stream corresponds. Accordingly, the summed digital sample stream corresponding to a first spectral region 451 is provided to a first digital up-converter which corresponds to the first spectral region 451. Similarly, the summed digital sample stream corresponding to the monitor path 403 is provided to a monitor path digital up-converter 505. The digital up-converters 504, 505 up-convert the digital samples in their respective digital sample stream and provide their respective (up-converted) digital sample stream to a digital-to-analog converter 506. Each digital-to-analog converter 506 as well as the monitor path digital-to-analog converter 507 converts their respective digital sample stream into an (analog) IF signal. Each IF signal is provided to an RF up-converter 508 for the spectral region (band) to which the IF signal corresponds. Each RF up-converter 508 up-converts the IF signal to its appropriate RF spectrum and provides the resulting RF band as an uplink signal to the appropriate upstream unit (e.g., BTS 110). Similarly, the monitor path RF up-converter 509 up-converts the IF signal for the monitor path to the desired RF spectrum and provides the resulting RF signal to the signal analysis module 126.

The example shown in FIG. 5 corresponds to uplink signals provided by the host unit 102 (e.g., to BTS 110 and signal analysis module 126) that are at RF frequencies. As mentioned above, in other examples the uplink signals provided by the host unit 102 can be at IF frequencies in which case the RF up-converters 508, 509 are not used. In yet other examples, the uplink signals provided by the host unit 102 are digital sample streams, in which case neither the digital-to-analog converters 506, 507 or the RF up-converters 508, 509 are used. The host unit 102 can provide multiple uplink signals and each uplink signal can be individually configured to be at an RF or IF frequency or be a digital sample stream.

In an example, the deserializer/deframers 502, simulcast module 111, and the digital up-converters 504 are implemented with a processing device such as an FPGA. Since an FPGA is a field programmable device, it can be adjusted to meet changing needs of the end user. For example, the center frequencies and bandwidths of the digital up-converters 504, 505 can be individually reprogrammed in order to shift the locations of spectral regions that they process. The number of individual signal paths may be increased by configuring the FPGA with additional digital up-converters and digital down-converters. In one embodiment, a plurality of predefined configuration builds is stored in a memory, and the FPGA can be reconfigured by pushing a new build image onto the FPGA.

Figure 6:
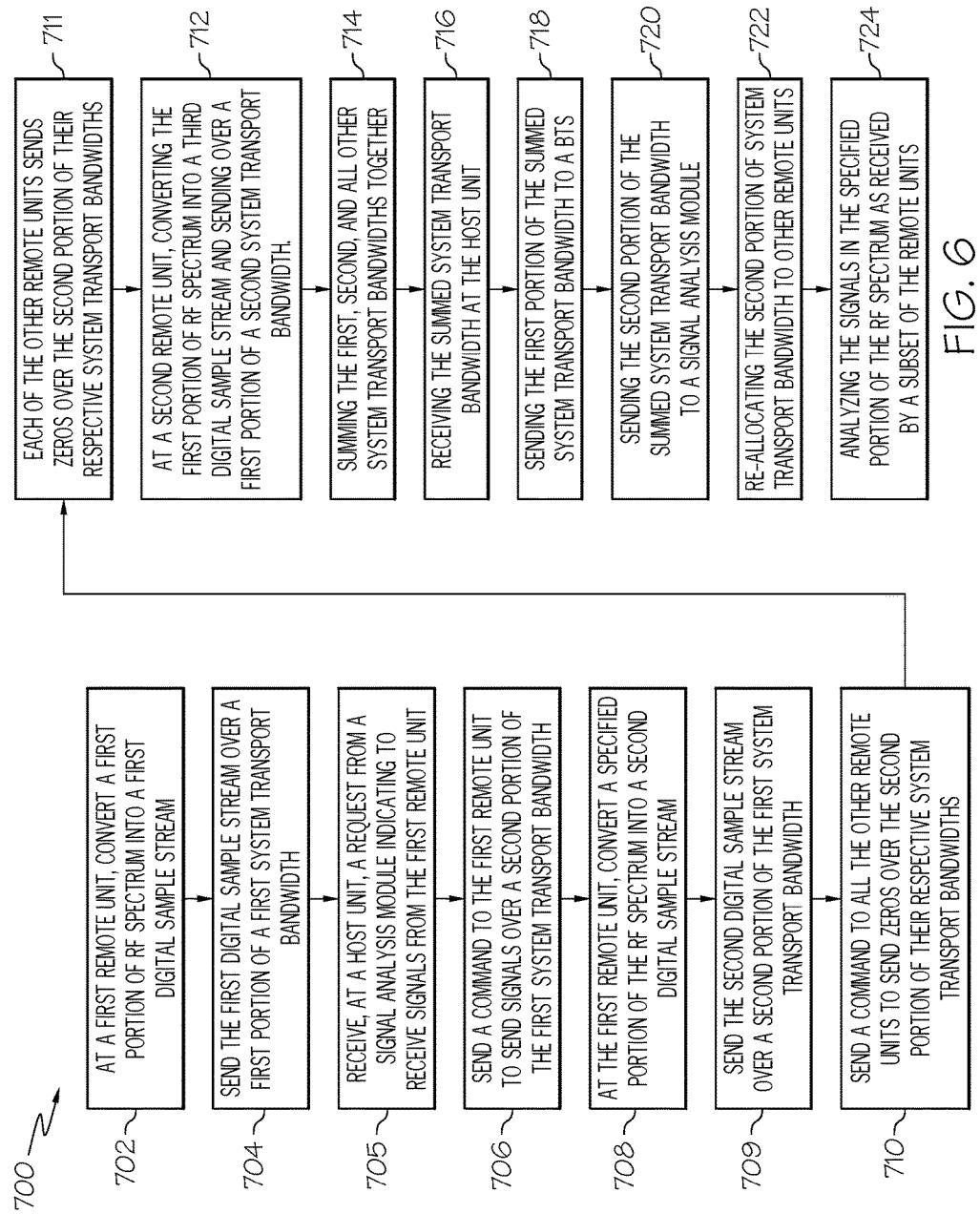
FIG. 6 is a flow chart of an example method of operation of the DAS of FIGS. 1A, 1B, and 1C.

FIG. 6 illustrate a flow diagram of an example method 700 for providing digital transport of signals through a DAS 100 to a signal analysis module 126. The method 700 begins at block 702 where, at a first remove unit 106-1, a first portion of received RF spectrum is converted into a first digital sample stream. At block 704, the first digital sample stream is sent to the host unit 102 over a first subset of resource blocks 401 of a first uplink transport signal.

At block 705, the host unit can receive a request from a signal analysis module indicative of a subset of remote units 106 from which the signal analysis module would like to receive signals. At block 706, in response to the command, the host unit 102 sends a command instructing the subset of remote units 106 (e.g., the first remote unit 106-1) to send a digital sample stream for signal analysis over the monitor path of its (a first) uplink transport signal. In an example, the request from the signal analysis module can further include a specified spectral region to which the digital sample stream on the monitor path 403 is to correspond. According thereto, the command from the host unit 102 can instruct the first remote unit 106-1 to send a digital sample stream of a specified center frequency and bandwidth on the monitor path 403 for signal analysis. At block 708, the first remote unit 106-1 generates a second digital sample stream corresponding to the specified center frequency and bandwidth for signal analysis. At block 709, the first remote unit 106-1 sends the second digital sample stream to the host unit over the monitor path 403 of the first uplink transport signal. At block 710, the host unit can send a command to all the other remote units in the plurality of remote units 106 except the subset of remote units, instructing the other remote units to send a null signal (e.g., no data) on the monitor paths 403 of their respective uplink transport signals. At block 711, each of these other remote units can disconnect (or connect to zero) their monitor path digital down-converter 307.

At block 712, a second remote unit 106-2 generates a third digital sample stream corresponding to the first portion of RF spectrum, and sends the third digital sample stream over a first subset of resource blocks 401 of its (a second) uplink transport signal, wherein the first and second uplink transport signal comply with the common arrangement 460. At block 714, a simulcast module 111 sums the first uplink transport signal with the second uplink transport signal to generate a summed uplink transport signal, wherein the simulcast module 111 sums resource blocks of the first uplink transport signal with like resource blocks of the second uplink transport signal and the summed uplink transport signal complies with the common arrangement 460. Accordingly, the simulcast module 110 generates a summed uplink transport signal including a new first subset of resource blocks 401 corresponding to the sum of the first subset of resource blocks 401 from the first uplink transport signal and the first subset of resource blocks 401 from the second uplink transport signal and a new monitor path subset of resource blocks 403 corresponding to the sum of the monitor path subset of resource blocks 403 from the first uplink transport signal with the monitor path subset of resource blocks 403 from the second uplink transport signal.

At block 716, the host unit 102 can receive the summed uplink transport signal. At block 718, the host unit 102 can send the first subset of resource blocks 401 from the summed uplink transport signal to one or more base transceiver stations 110. At block 720, the host unit 102 can send the monitor path subset of resource blocks 403 of the summed uplink transport signal to one or more signal analysis modules 126.

At block 722, the host unit 102 can repeatedly modify which remote unit(s) 106 send digital sample streams on the monitor path 403, such that signals are received at the signal analysis module 126 from different remote units 106 over time. In an example, this can include scanning through each of the remote units 102 in the plurality of remote units 102 in subsets (e.g., individually).

At block 724, the host unit 102 can analyze the specified portion of the RF spectrum as received by a subset of the remote units 106. This analysis can be used to, for example, determine a location of a mobile device 108 transmitting signals within the specified spectral region based on which remote units 102 are receiving signals from the mobile device 108 within the specified spectral region. The analysis can also be used for a self-optimizing network. The analysis can also be used to identify malfunctioning remote units 102.

What is claimed is:

1. A distributed antenna system comprising:
   a host unit;
   a plurality of remote units communicatively coupled to the host unit by a plurality of communication links, wherein the plurality of remote units are configured to implement a common arrangement of resource blocks for uplink transport signals on associated ones of the plurality of communication links;
   wherein the host unit is configured to instruct a subset of the plurality of remote units to send a digital sample stream over a monitor path of their respective uplink transport signals, wherein the instruction from the host unit indicates to which antenna of multiple antennas at each respective remote unit in the subset of remote units the digital sample stream is to correspond;
   wherein at least one of the host unit and one of the plurality of remote units is configured to:
   implement simulcasting of signals;
   sum the monitor paths from the respective uplink transport signals to generate a summed digital sample stream; and
   send the summed digital sample stream to the host unit; and
   wherein the host unit is configured to provide a signal based on the summed digital sample stream to one or more signal analysis modules.

2. The distributed antenna system of claim 1, wherein the host unit is configured to command all remotes units in the plurality of remote units except the subset of remote units to send a null signal on the monitor path of their respective uplink transport signals.

3. The distributed antenna system of claim 1, wherein the plurality of remote units are configured to send digital sample streams destined for a base transceiver station on one or more other resource blocks of their respective uplink transport signals;
   wherein the plurality of remote units are configured to send like portions of the received radio frequency (RF) spectrum on like resource blocks of their respective uplink transport signals;
   wherein the at least one of the host unit and one of the plurality of remote units is configured to:
   sum the one or more other resource blocks of the respective uplink transport signals to generate one or more other summed digital sample streams;
   sum like portions of the respective uplink transport signals together and maintain the positioning of digital sample streams from their respective uplink transport signal according to the common arrangement of resource blocks; and
   wherein the host unit is operable to provide the one or more other summed digital sample streams to one or more base transceiver stations.

4. The distributed antenna system of claim 3, wherein the monitor path includes one or more first timeslots in a respective digital transport frame and the one or more other resource blocks include one or more other timeslots in the respective digital transport frame.

5. The distributed antenna system of claim 4, wherein the at least one of the host unit and one of the plurality of remote units is configured to send a summed digital transport frame wherein one or more first timeslots in the summed digital transport frame correspond to a sum of the one or more first timeslots in the respective digital transport frames, and wherein one or more other timeslots in the summed digital transport frame correspond to a sum of the one or more other timeslots in the respective digital transport frames.

6. The distributed antenna system of claim 5, wherein the one or more signal analysis modules include a self-organization monitor configured to track usage and interference patterns and use that information to direct wireless capacity.

7. The distributed antenna system of claim 1, wherein the subset of remote units consists of a single remote unit, and wherein the antenna of the multiple antennas consists of a single antenna corresponding to a frequency band.

8. The distributed antenna system of claim 7, wherein the host unit is configured to modify to which antenna of the multiple antennas that the digital sample stream corresponds in order to analyze signals from different antennas of the multiple antennas at different times.

9. The distributed antenna system of claim 7, wherein the multiple antennas are diversity antennas.

10. The distributed antenna system of claim 1, wherein the host unit is configured to repeatedly modify which of the plurality of remote units send a digital sample stream over the monitor path of their respective uplink transport signals.

11. The distributed antenna system of claim 10, wherein the signal analysis module is configured to analyze signals based on the summed digital sample stream in order to analyze signals from different remote units within the plurality of remote units.

12. The distributed antenna system of claim 11, wherein the host unit is configured to scan through all the remote units such that the signal analysis module can scan signals received by all the remote units.

13. The distributed antenna system of claim 1, wherein at least the subset of remote units include the multiple antennas, wherein the multiple antennas correspond to a common frequency band,
   wherein the at least the subset of remote units are configured to generate distinct digital sample streams for each antenna of the multiple antennas, and to provide each distinct digital sample stream on one or more distinct resource blocks of the common arrangement of resource blocks.

14. A host unit for use within a distributed antenna system having a plurality of remote units communicatively coupled to the host unit by a plurality of communications links, the host unit comprising:
    circuitry configured to:
        instruct a subset of the plurality of remote units within the distributed antenna system to send a digital sample stream over a monitor path of respective uplink transport signals for the subset of the plurality of remote units, wherein the plurality of remote units are configured to implement a common arrangement of resource blocks for uplink transport signals on associated ones of the plurality of communication links, wherein the instruction from the host unit indicates to which antenna of multiple antennas each respective remote unit in the subset of remote units the digital sample stream is to correspond;
        implement simulcasting of signals;
        sum the monitor paths from the respective uplink transport signals to generate a summed digital sample stream; and
        provide a signal based on the summed digital sample stream to one or more signal analysis modules.

15. The host unit of claim 14, wherein the circuitry is configured to command all remotes units in the plurality of remote units except the subset of remote units to send a null signal on the monitor path of their respective uplink transport signals.

16. The host unit of claim 14, wherein the circuitry is configured to modify to which antenna of the multiple antennas that the digital sample stream corresponds in order to analyze signals from different antennas of the multiple antennas at different times.

17. The host unit of claim 14, wherein the multiple antennas are diversity antennas.

18. The host unit of claim 14, wherein the circuitry is configured to repeatedly modify which of the plurality of remote units send a digital sample stream over the monitor path of their respective uplink transport signals.

19. A remote unit for use within a distributed antenna system having a host unit and a plurality of remote units communicatively coupled to the host unit by a plurality of communication links, the remote unit comprising:
    circuitry configured to:
        implement a common arrangement of resource blocks for uplink transport signals on an associated communication link of the plurality of communication links, wherein the host unit is configured to instruct a subset of the plurality of remote units to send a digital sample stream over a monitor path of their respective uplink transport signals, wherein the instruction from the host unit indicates to which antenna of multiple antenna sat each respective remote unit in the subset of remote units the digital sample stream is to correspond;
        implement simulcasting of signals;
        sum the monitor paths from the respective uplink transport signals to generate a summed digital sample stream; and
        send the summed digital sample stream to the host unit, wherein the host unit is configured to provide a signal based on the summed digital sample stream to one or more signal analysis modules.

20. The remote unit of claim 19, wherein the circuitry is configured to:
    send a digital sample stream destined for a base transceiver station on one or more other resource blocks of respective uplink transport signals for the plurality of remote units;
    send like portions of the received radio frequency (RF) spectrum on like resource blocks of the respective uplink transport signals for the plurality of remote units;
    sum one or more other resource blocks of the respective uplink transport signal for the plurality of remote units to generate one or more other summed digital sample streams;
    sum like portions of the respective uplink transport signals together and maintain the positioning of digital sample streams from their respective uplink transport signal according to the common arrangement of resource blocks, wherein the host unit is operable to provide the one or more other summed digital sample streams to one or more base transceiver stations.

* * * * *